Oct. 10, 1944.  A. C. FISCHER  2,359,755
SELF-PACKING PIPE JOINT MOLD
Filed April 20, 1940   2 Sheets-Sheet 1

Inventor,
ALBERT C. FISCHER,
By Knight Bros.
Attorneys.

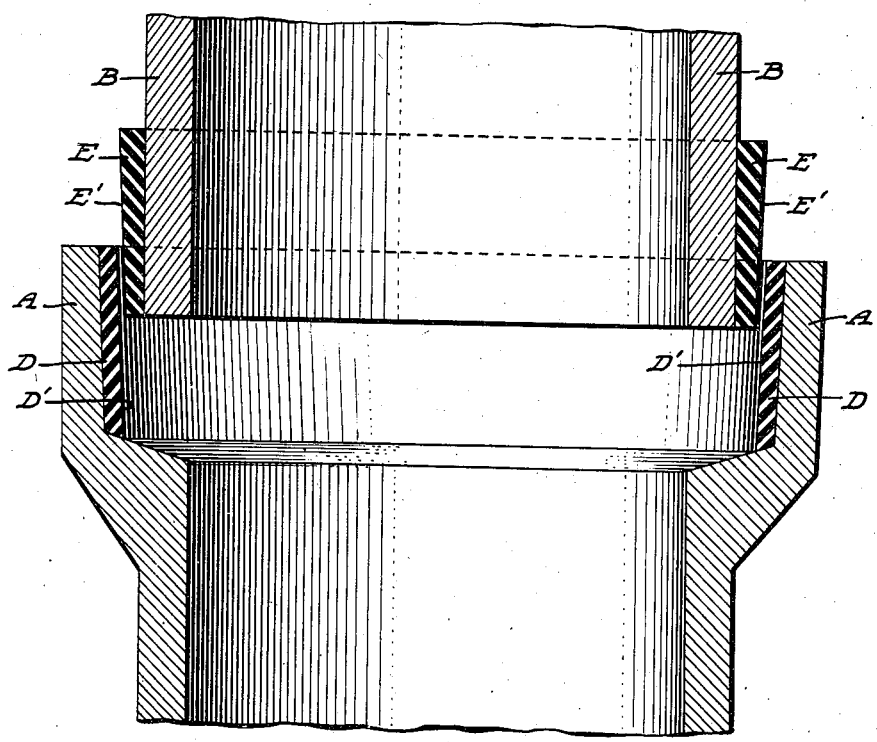
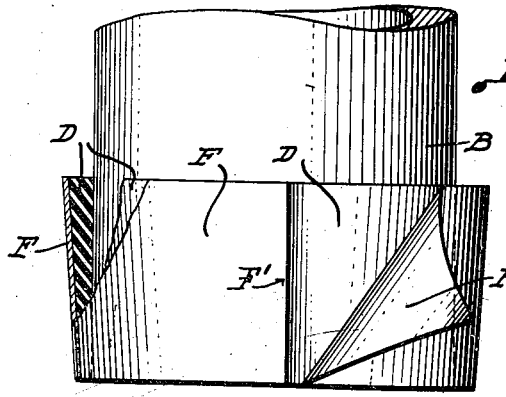

Patented Oct. 10, 1944

2,359,755

UNITED STATES PATENT OFFICE 2,359,755

SELF-PACKING PIPE JOINT MOLD

Albert C. Fischer, Chicago, Ill.

Application April 20, 1940, Serial No. 330,769

7 Claims. (Cl. 25—126)

This invention relates to packings for sealing the joints between pipe sections which, as in the case of bell and spigot joints, for instance, are assembled telescopically; and particularly packings comprising two concentric annular members of plastic or other suitable material, which are mounted, the one as a lining within the bell, and the other as a facing, upon the spigot, and which, as the pipe sections are brought together, seat telescopically, one within the other, and, by filling the annular space between the overlapping faces of the pipe sections, effect a gas and liquid tight sealing of the joint.

One object of the invention is to devise a more economical and more accurately effective method of producing upon the bell and spigot ends, the lining and facing members required to produce the packing, and particularly the complementary inclined surfaces through which the packing members meet in their telescoping action, to which end one feature of the invention resides in a procedure which comprises taking two pipe ends of telescopically assembled type, for instance bell and spigot jointed pipe sections, and which, when assembled, leave an annular packing space between their overlapping surfaces; juxtaposing these pipe ends coaxially but untelescoped, and with the necessary annular packing space between them; temporarily dividing the said annular packing space by a (preferably uniformly gaged metallic) mold wall in the form of a tapering annulus, into two packing-member molds, to wit: a lining mold, the confines of which will be provided, respectively, by one plane surface of the temporary mold wall and the opposed inner face of the pipe bell; and a facing mold, the confines of which will be provided, respectively, by the other plane surface of the temporary mold wall and the outer surface of the spigot; (the tapered annulus that provides the temporary mold wall being of sufficient axial dimension to present portions of its two surfaces opposite the bell and spigot surfaces notwithstanding their presentation in untelescoped relation) and thereupon pouring or tamping into, or otherwise filling an appropriate (preferably plastic) packing material into the two molds, with the result that when the temporary mold wall and pipe sections are disassembled, the bell and spigot pipe ends will have deposited upon them their appropriate telescopic packing members of desired thickness; the exposed inclined faces through which these packing members meet in the telescopic assembly of the pipe, will have been formed simultaneously by the opposite plane faces of one and the same uniformly gaged metal wall and by areas of a tapered annulus that are not opposite, but axially spaced in proper ratio to the angle of taper and thickness of the temporary mold wall; these packing surfaces will be of appropriate geometric dimensions to insure proper seating; the desired degree of exactness in these dimensions and in their complementary relationship will have been assured and all these results will have been attained with a maximum of convenience and with a minimum of expenditure of time and materials.

Another object of the invention is to provide a means for assembling the pipe sections and temporary mold wall in relation to assure the results of the procedure just described; and to this end another feature of the invention comprises a base ring united to the temporary mold wall in an intermediate diametric plane of said wall, supporting the spigot end of the pipe at the desired elevation above the shoulder of the bell and forming a bottom confine for the facing mold; centering legs, depending from the base ring and entering and fitting the minor bore of the bell end, and spacing the mold wall from its opposed inner face of the bell; and fingers projecting upwardly from the base ring and positioned to center the spigot end of the pipe, as it rests upon the base ring, at the proper space from the wall of the bell, or from the opposing face of the temporary subdividing wall which, together with the spigot, form the confines of the facing mold.

In carrying out the invention and in order to improve the physical characteristics of the packing material used in a two part packing of the kind herein employed, as well as to improve the effect of the packing under stresses which tend to disturb the alignment of the jointed pipe in service, the invention preferably proceeds upon though it is not limited to the further principle of combining with telescoping pipe joints, two part packings the members of which have the capacity to unite and form an integral body when pressed together by wedging telescopic action, especially when one or both of the melting faces of the packing members have been treated to an appropriate solvent; but which said packing members, as well as the solvent used therewith, are of such composition that while the softened and merged, or integralized material will automatically resume normal state when allowed to set, it wil be not through evaporation which presupposes a self-drying and ultimately brittlized packing that may crack under later stresses disturbing the alignment of the joint, but through absorption of the solvent in, or its gradual dissipation through the whole body of the packing; and preferably the packing employed will include such substantial proportions of non-evaporative or non-drying ingredients, such for instance as boiled vegetable oils, with or without bituminous oils and fillers, all of which materials are miscible in substantially all proportions, that the packing after proper installation will absorb any solvent used in sealing the abutting faces, and will exist indefinitely thereafter as a sluggishly deformable mass that will yield without cracking or leakage to slight angular displacements of the jointed members, such for instance as, settlement of house framing, settlement of earth in trenches, etc.

In the accompanying drawings:

Figure 3 is an axial sectional view showing the two pipe sections ready for assembly; and Fig. 4, a modification thereof.

Figure 1:
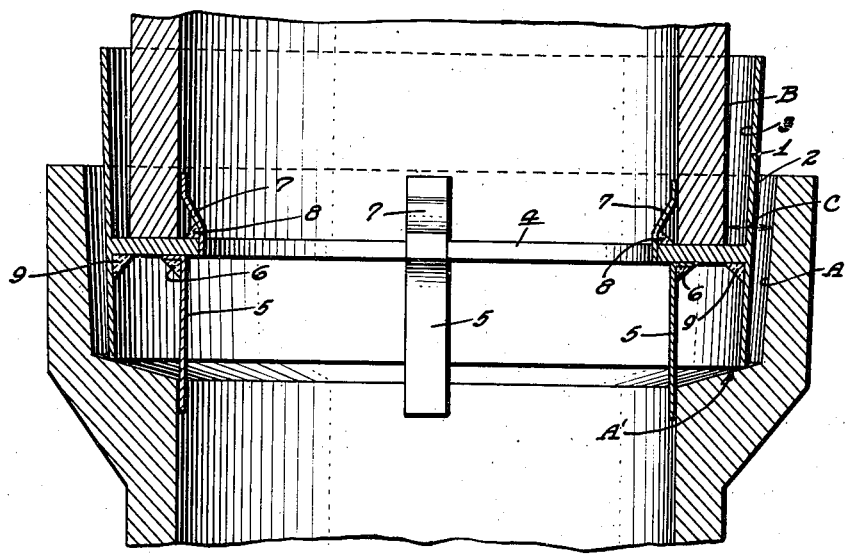
Figure 1 is a vertical axial section.
Figure 2:
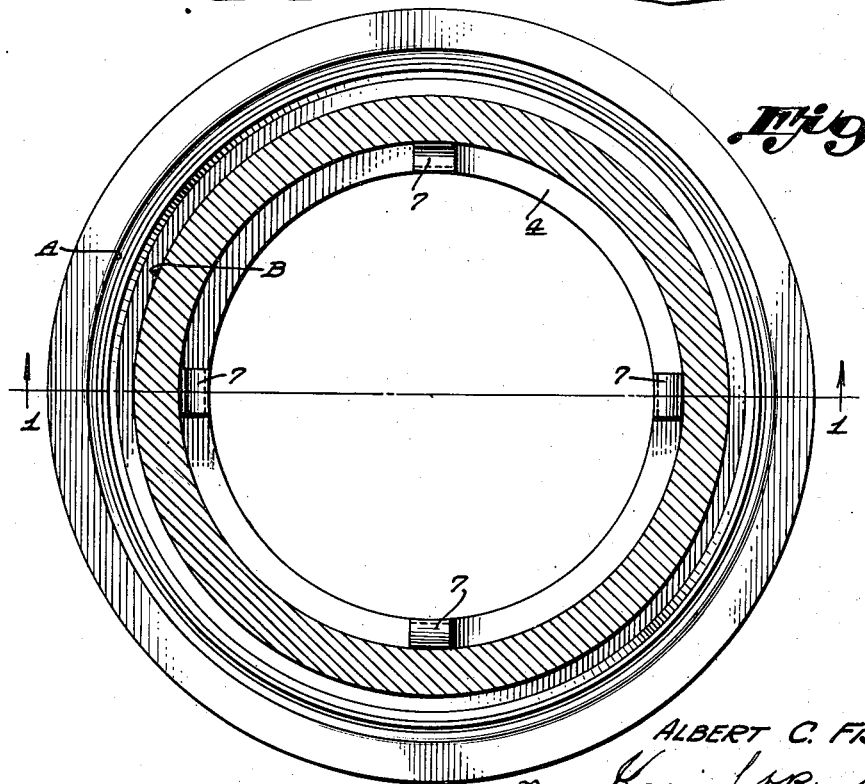
Figure 2 is a plan view (with the spigot pipe end in horizontal section) showing an assembly of two pipe ends, the temporary mold wall and the assembling device appropriate to the practice of the invention.

A and B are, respectively, the bell and spigot ends and C indicates the annular packing space, of telescopically assembled pipe sections. D (Figure 3) is the packing member mounted as a liner upon the inner surface of the bell A; and E is the complementary packing member mounted as a facing upon spigot B. While this design of telescopically assembled pipe is selected for purposes of illustration, it is to be understood that the invention is applicable to other designs of telescopically assembled pipe as well.

The problem of conveniently, economically, and accurately mounting packing members D and E upon the pipe ends, to wit—a lining D upon the bell surface A and a facing E upon spigot surface B, and at the same time insuring correspondingly inclined complementary faces on lining D and facing E, is solved according to the present invention by temporarily locating (for instance standing upon the shoulder A' of bell A and rigidly bracing by base ring 4) a tapered annular mold wall 1, preferably of thin uniform gage metal, in position to subdivide the packing space C into two molds, to wit—a liner mold C', the confines of which are 2, A and A' and the product of which is liner D (Figure 3) having a sealing surface D' formed by the surface 2 of wall 1; also a facing mold defined by confines B, 3 and 4a, the depth of which is measured by the height of wall 1 above the base ring 4 and the effect of which is to leave adhering to the outer surface of spigot B, a facing E having a sealing surface E' formed by surface 3 of mold wall 1 which, being opposite to the surface 2 of said wall, to wit, a sheet metal structure of substantially constant gage, is peculiarly adapted to insure a sealing surface E', on the facing, which is strictly complementary to the sealing surface D' of the lining; and since the former is produced by a portion of a conic surface more remote from the apex of the cone than the surface that produces the sealing surfaces of the liner, the former will be of as great or greater transverse dimension than the latter and insure a snug sealing fit under telescoping action.

Legs 5 rigidly united to base ring 4, for instance by weld fillets 6, are fashioned to center the ring relatively to the juxtaposed pipe sections A, B, while fingers 7 rigidly fixed to the ring by weld fillets 8, determine the spacing between pipe sections B and A; in other words, maintain the packing space C. Pipe section B is supported vertically by base ring 4 during molding of the packing members D and E; said basering being supported in turn by the molding wall 1, to which it may be rigidly united by weld fillet 9. The assembly of the molding apparatus is such that it readily separates, bodily from both pipe sections upon completion of the work of molding the packing members; and it can be restored to assembly with equal facility, with a new pair of sections. The principle of packing the joints of bell and spigot pipe sections by molding a collar or facing of joint sealing material upon the spigot end, and a lining band of like material within the bell end of the pipe and causing these packing members to become united in the act of telescopically assembling the pipe sections, had long been taught in such patents as that of Stanford No. 156,357, issued December 1, 1874, and others; and the problem of composing mastic or plastic packing materials best capable of meeting the requirements of self-sealing joints to the end that packing members mounted on two members shall become integralized into a gastight and liquid-tight seal, and take on a proper cure and set, was solved by inventions constituting the subject matter of Letters Patent of the United States applied for by me between the years 1919 and 1927, and described as self-sealing air and water tight joints for building structure; for instance, Letters Patent No. 1,592,760, issued July 13, 1926, upon the principle of mounting upon selected and restricted portions of one or both of two members to be assembled, a plastic joint packing and sealing material having the inherent quality of reacting under a solvent to render it adhesive. Said Letters Patent No. 1,592,760, teaches the use of a mastic material of lasting or continuing adhesiveness with or without a covering sheet protecting it during transportation, but readily peeled off to expose the adhesive material at time of use; also the alternative of using a mastic not immediately adhesive, but readily responsive to a solvent applied thereto and rendering it adhesive at the time of putting the material into use.

I may employ any of the above expedients in the pipe joint packing of my present invention, or one or more of the formulae and expedients taught in my Letters Patent No. 1,743,764, issued January 14, 1930, to wit, the use of cementitious substances containing highly volatile oils which, at the time of effecting the sealed joint, may be evaporated so as to leave the residue to serve as a cement to bind the members of the joint together. Or I may practice the art as taught in my last-named patent, of sealing joints by supplying the material to be joined with a coating consisting of cementitious substances, including among others, powdered bituminous products, singly or in combination with vegetable or animal products, and intensifying their inherent adhesiveness at the time of use, by subjecting the substance or composition to the action of a solvent such as toluol, benzol, kerosene, etc., and permitting the surplus solvent to evaporate and cure the seal joint after the joint is completed.

But while I may utilize the phenomenon of curing by evaporation, the seal resulting from the integralizing of the meeting surfaces of the two packing members, this principle being an incident of a self-drying packing, is liable to result in brittlizing and cracking or other leak-producing deterioration in the joint after the lapse of time, especially under bending stresses that may be imposed upon a joint; for which reason I prefer to take advantage of the slow drying or non-drying phenomena in compounding plastics or mastics for sealed structural joints; for instance as taught in my patent, No. 1,789,286, which teaches the production of packings from high melting point bituminous materials such as gilsonite, Texas or Trinidad asphalt, together with a non-drying or slow-drying saturant or vehicle, for example blown castor oils, rape seed oils, etc., which will mix with asphalt in any desirable proportion (especially if heat and pressure be used) and have the proportion of the vehicle sufficiently below saturation to admit of some additional absorption, so that when an appropriate solvent is used upon the meeting surfaces of the self-sealing joint the seal will cure itself by absorption of the surface solvent into, or its dissemination through the body of the packing material, rather than by evaporation. Such a composition material, while indefinitely sustaining the physical integrity of a joint even between such heavy structural members as pipe sections, especially when encased by the bell or an equivalent surrounding wall of a pipe section, will also exhibit the useful phenomenon of never, or at least not within a usefully long duration of time, drying out to an embrittled physical condition, but will on the contrary, maintain a sluggishly deformable consistency which would insure compensation of slight joint-flexures without cracking or leakage, at any time that flexing stresses might be imposed as by settling of pipe supporting media.

My aforesaid patent, No. 1,789,286, indicates formulae employing from 10 to 20, or even as low as 5% of the bituminous substance, the remaining constituency of from 80 to 95% being non-drying oil, such as castor oil or castor oil and rape seed oil combined; or even a combination of cotton seed oil or cotton seed oil foots. It also indicates the use of pitch and semi-liquid bituminous substances. For an even fuller discussion and wider application of the preferred type of self-sealing non-drying and sluggishly conforming packing material, reference may be had to my Letters Patent No. 1,881,439, issued October 11, 1932, for improvements in Packings.

Referring now more particularly to Figures 3 and 4, it is to be understood that while the packing members D and E may be of any of the materials described in any of my Letters Patent herein identified, or any equivalent thereof or any other suitable material that may be desired, I prefer that the said packings contain solvent or vehicular ingredients having the inherent qualities of being non-evaporative or non-drying; lastingly deformable (sluggishly); and absorptive of additional solvent or vehicle at least to an extent that will take up or cause dissemination through the packing body, of such solvent as may be desirably applied to the surfaces D' and E' at the time of telescopic assembly of the pipe members.

In Figure 4 is shown a special application of the inventive idea taught in my Letters Patent No. 1,592,760, of temporarily applying, over an adhesive sealing surface, a removable protecting sheet F, which may be saturated with sodium silicate or other non-adhering material; the said protecting strip in this instance being in the form of a collar, subdivided on a transverse line F'' to leave it convenient for prehension in peeling it from the packing. Such a protective collar, especially if made with some degree of toughness, may lend another function in the situation in which it is here used, namely, that of protecting the sealing surface of the packing member on the spigot end, which is more vulnerably exposed than the liner within the bell.

Still another function afforded by the removable protective sheet or collar F in Figure 4, especially if it be made of material absorptive of the solvent desired to be used, is that of serving as a vehicle to take up the solvent in quantity limited by the absorptive capacity of the protective material, and so impart to the packing surface the proper amount of solvent, without surplus and leaving the seal more promptly curable, besides loosening the protective cover and making it more readily removable.

It is to be understood that "curing" of the seal herein referred to contemplates prompt dissipation of sufficient solvent from the meeting or integralized surfaces of the packing material to leave the seal in lasting cured condition without relying upon evaporation which may be retarded by submergence or burying of the joint.

The invention further contemplates as a preferential, though not indispensable feature, the principle of curing by dissemination of solvent combined with rendering non-drying or increasing existent non-drying conditions and retention of sluggish deformability, by the use of a solvent the evaporative function of which is substantially nil, or at least so much slower than the absorptive affinity of the packing for the solvent, that curing of the seal will be by absorption or dissemination, and not by evaporation.

I claim:

1. In the production of packing members between an outer bell-end pipe section having an offset shoulder and an inner spigot-end pipe section adapted to telescopically enter said bell-end and leave an annular packing space between said ends, the improvement which consists in supporting the inner pipe section coaxially with the outer pipe section with the spigot-end spaced from the shoulder of the bell-end, in the direction of their common axis; removably introducing into the packing space and against the shoulder of the bell, a thin metal mold wall of tapered annular section, in position to subdivide the packing space into a lining mold defined by one face of the mold wall and the opposing inner face of the bell and a facing strip mold defined by the other face of the mold-wall and the opposing outer face of the spigot; closing the facing strip mold across the end of the spigot; and thereupon forming in the respective molds a plastic bell liner and a plastic spigot facing strip having faces inclined to the axis of pipe assembly, formed by differently dimensioned portions of the mold wall, and adapted to meet and close the packing space in the telescopic assembly of the bell and spigot.

2. In apparatus for lining and facing respectively radially spaced outer and inner telescopically assembled tubular members, with packing bodies which unite, in such assembly, and pack the space between such tubular members; a tubular molding wall having a transverse dimension that adapts it to receive such tubular members on either side of it in positions to form between said wall and the respective tubular members, molds that will give the desired definition to the packing bodies; said molding wall having projections positioned to receive and center both tubular members relatively to said mold wall and to each other and there being a bottom closure for the mold that is on the inner side of said mold wall, said bottom closure being at a level that is above the bottom of the mold that is on the outer side of the molding wall.

3. Apparatus as described in claim 2 in which the mold wall is constructed to rest its lower end upon the outer tubular member, is diametrically enlarged upwardly from its said lower end, and carries a base ring in position to receive the lower end of the inner tubular member and position said inner tubular member opposite a portion of the mold wall that is of larger diameter than the portion that is opposite the outer tubular member.

4. In the production of packings between bells and spigots of pipe, the improvement which comprises juxtaposing two pipes with their bell and spigot coaxial and suitably separated in the direction of their common axis and with an annular packing space between their opposed faces; partitioning said packing space intermediately of said opposed faces and forming, thereby, inner and outer molds; and then, while maintaining closure of one end of the inner mold, charging a plastic material into the two molds and in adherence upon opposed faces of the bell and spigot to form complementary annular packing members adapted to telescope one within the other and thereby compose a packing within said packing space.

5. A circumferential die adapted to mold linings on the ends of two pipe sections placed one above the other with the spigot ends thereof disposed downwardly and with the upper shouldered bell end of the lower pipe section receiving the spigot end of the upper pipe section, said circumferential die having a surface of revolution spacedly disposed between the lateral surfaces of the bell end of the lower pipe section and the spigot end of the upper pipe section and supported by the shoulder of the bell end and adapted to mold a lining of packing material upon the interior of said bell end and the exterior of said spigot end preparatory to effecting a junction between said ends, and a limiting surface on one side of said surface of revolution and disposed transversely thereto for confining the lining at the lower spigot end of the upper pipe section.

6. A circumferential die adapted to mold linings on the ends of two pipe sections placed one above the other with the spigot ends thereof disposed downwardly and with the upper shouldered bell end of the lower pipe section receiving the spigot end of the upper pipe section, said circumferential die having a frusto-conical surface of revolution flaring upwardly and spacedly disposed between the lateral surfaces of the bell end of the lower pipe section and the spigot end of the upper pipe section and supported by the shoulder of the bell end adapted to mold a lining of packing material upon the interior of said bell end and the exterior of said spigot end preparatory to effecting a junction between said ends, and a substantially horizontal limiting surface on one side of said surface of revolution and the shoulder of the bell end functioning as an additional limiting surface for confining the linings at the lower ends on the opposite sides of said surface of revolution.

7. A circumferential die adapted to mold linings on the ends of two pipe sections spaced one above the other with the spigot ends thereof disposed downwardly and with the upper interiorly shouldered bell end of the lower pipe section receiving the spigot end of the upper pipe section, said circumferential die supported on the shoulder of the bell end coaxially therewith and having a frusto-conical surface of revolution flaring upwardly and spacedly disposed between the lateral surfaces of the bell end of the lower pipe section and the spigot end of the upper pipe section adapted to mold a lining of packing material upon the interior of said bell end and the exterior of said spigot end preparatory to effecting a junction between said ends, said die being provided with a substantially horizontal shoulder interiorly thereof which together with said shoulder on the bell end constitute limiting surfaces on the opposite sides of said surface of revolution for confining the linings at the lower ends thereof.

ALBERT C. FISCHER.